United States Patent [19]

Tsuge et al.

[11] Patent Number: 4,613,188
[45] Date of Patent: Sep. 23, 1986

[54] CHILD RESTRAINING DEVICE

[75] Inventors: Hiroshi Tsuge; Akinori Fujiwara; Hiroki Iwasa; Chikao Nagasaka; Tsutomu Muraoka, all of Niwa, Japan

[73] Assignee: Kabushiki Kaisha Tokai-rika-denki-seisakusho, Aichi, Japan

[21] Appl. No.: 683,234

[22] Filed: Dec. 18, 1984

[30] Foreign Application Priority Data

Dec. 19, 1983 [JP] Japan .......................... 58-195150[U]

[51] Int. Cl.$^4$ .............................................. A47C 1/08
[52] U.S. Cl. .................................... 297/250; 297/216; 297/377; 297/464
[58] Field of Search ............... 297/377, 250, 253, 254, 297/255, 256, 216, 464, 325, 354, 355

[56] References Cited

U.S. PATENT DOCUMENTS

| | | | |
|---|---|---|---|
| 3,858,936 | 1/1975 | Gerkin | 297/377 |
| 4,186,962 | 2/1980 | Meeker | 297/377 X |
| 4,500,133 | 2/1985 | Nakao et al. | 297/377 |

FOREIGN PATENT DOCUMENTS 2540054  3/1977  Fed. Rep. of Germany ...... 297/377

Primary Examiner—James T. McCall
Attorney, Agent, or Firm—Sixbey, Friedman & Leedom

[57] ABSTRACT

A child restraining device is provided with a reclining mechanism including a supporting member for supporting a child receiving vessel mounted rotatably in a step manner thereon through crank means.

Accordingly, the vessel can be reclined readily in the step manner.

17 Claims, 6 Drawing Figures

CHILD RESTRAINING DEVICE

BACKGROUND OF THE INVENTION

1. Field of the Invention

The present invention relates to a child restraining device adapted for use in a vehicle, for restraining a child occupant on a seat of the vehicle.

2. Description of the Prior Art

In the vehicle an occupant restraining webbing is provided for restraining an occupant sitting on the seat.

The webbing is arranged so that when an adult occupant sits on the seat the webbing fits him. The arrangement can not always be applied fitly to the child occupant.

Accordingly, such a child restraining device has been proposed that a child receiving vessel is disposed on the seat of the vehicle to be secured thereto by the webbing, and the child occupant is protected properly by exclusive restraining means provided on the vessel after he sits on the vessel.

In the child restraining device the vessel is provided with a bottom plate portion for sitting, a back plate portion and a pair of side wall portions and it is secured to the seat of the vehicle by the webbing crossing over both the side wall portions.

In the child restraining device, however, a reclining mechanism is not provided in itself, which results in that the child restrained on the device is obliged to be keep himself in the same attitude for a long time in some cases.

Accordingly, it has been expected that the child restraining device is also provided with the reclining mechanism, but, if the reclining mechanism of the seat of the vehicle is applied to the child restraining device, then the reclining mechanism must be complicated, which results in increase in manufacturing costs of the reclining mechanism.

SUMMARY OF THE INVENTION

In view of the above fact, the present invention has as its object the provision of a child restraining device provided with a reclining mechanism having a simple construction.

In the child restraining device according to the present invention, a pair of distal end portions of a supporting member for supporting the child restraining vessel on the seat of the vehicle is mounted through crank means on the vessel rotatably in a step manner and a rear end portion of the supporting member is formed so as to abut on the seat, whereby a supporting angle of the vessel to the seat can be changed readily in the step manner.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
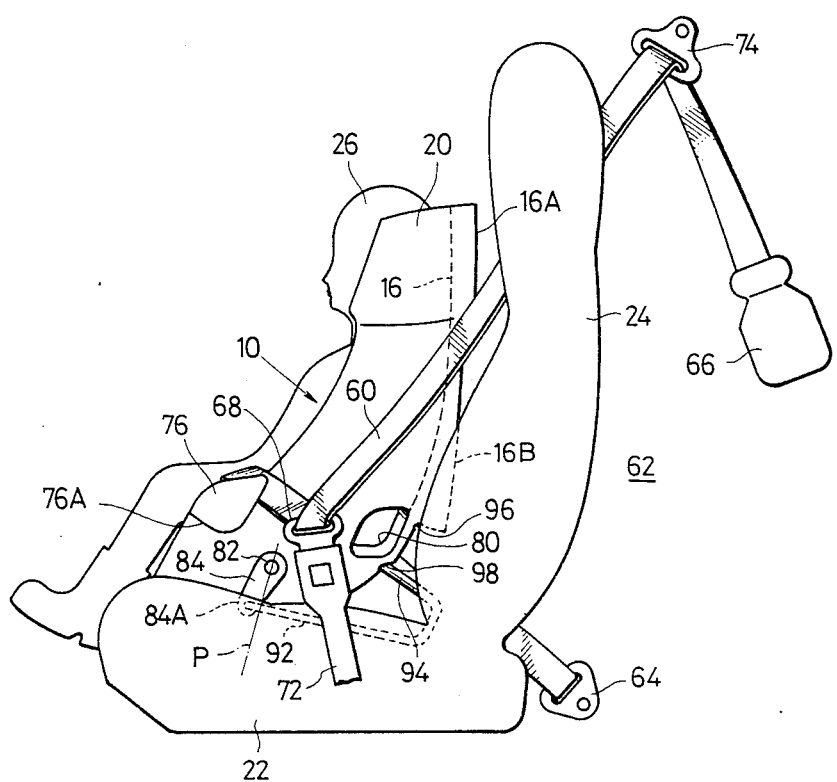
FIG. 1 is a side view showing a using situation of a child restraining device provided with a reclining mechanism according to the present invention is applied.
Figure 2:
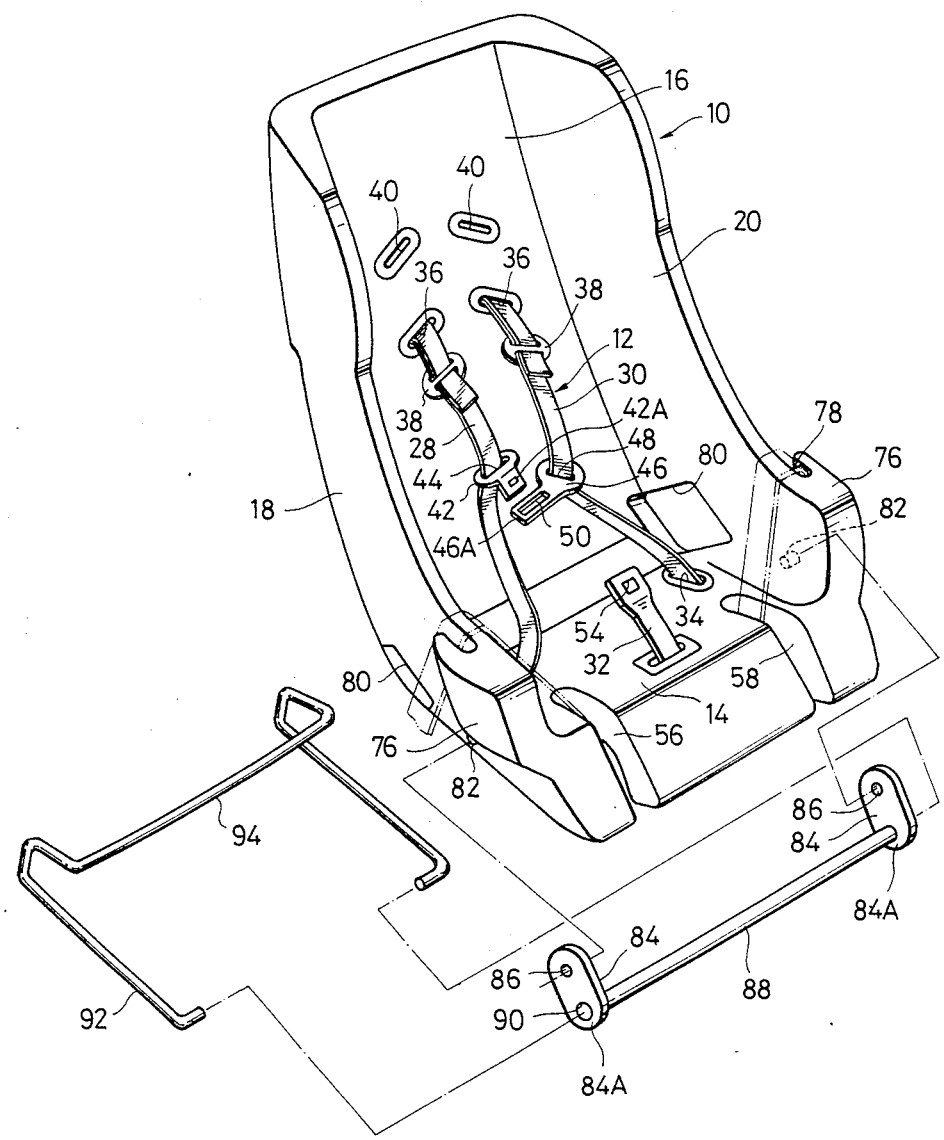
FIG. 2 is a partially disassembled perspective view of the child restraining device of FIG. 1.

In FIGS. 1 and 2 there is shown one embodiment of a child restraining device according to the present invention which includes a child receiving vessel 10 and child restraining means 12 secured thereto.

The vessel 10 is formed integrally of such a synthetic resin as plastics and includes a seat plate portion 14, a back plate portion 16 and a pair of side wall portions 18 and 20.

The seat plate portion 14 is put on a seat base 22 of a seat of a vehicle and the back plate portion 16 is caused to abut on a seat back 24 of the seat. The side wall portions 18 and 20 are extended from both sides of the seat plate portion 14 and the back plate portion 16, and they are positioned on both sides of a child occupant 26 sitting on the seat plate portion 14, whereby the child occupant 26 is restrained from movement towards his both sides.

The child restraining means 12 includes a pair of continuous webbings 28 and 30 and a buckle device 32. One end portions of the continuous webbings 28 and 30 are respectively extended through slit openings 34 formed on the seat plate portion 14 downwardly and they are secured to a back of the seat plate portion 14 by anchor means (not shown), whereby they are prevented from being pulled out. Also, the other end portions of the respective continuous webbings 28 and 30 are extended through slit openings 36 to a back of the back plate portion 16, they are turned back by anchor means (not shown) and they are again pulled out to the front of the back plate portion 16. The other end portions of the continuous webbings 28 and 30 is secured to length adjusters 38, whereby they are prevented from being further pulled out to the front of the back plate portion 16. Further, the back plate portion 16 is formed with other slit openings 40, so that the securing positions of the webbings 28 and 30 can be changed in accordance with a body buld of the child occupant 26 which sits on the seat plate portion 14.

The continuous webbing 28 is received at its intermediate portion in a slit 44 formed on a tongue plate 42 so that the tongue plate 42 is supported on the continuous webbing 28 movably in a longitudinal direction thereof. The tongue plate 42 is formed with a locking protrusion 42A latched to a buckle device 32.

On the other hand, the continuous webbing 30 is received at its intermediate portion in a slit opening 48 formed on a tongue plate 46, so that the tongue plate 46 is supported on the continuous webbing 30 movably in a longitudinal direction thereof. The tongue plate 46 is formed with a connecting protrusion 46A which is formed with a slit hole 50 receiving the latching protrusion 42A.

The buckle device 32 is mounted projectingly on the seat plate portion 14 and it is provided therein with a locking mechanism (not shown) for locking the locking protrusion 42A, whereby when the locking protrusion 42A is inserted in the buckle device 32 it is locked to the buckle device 32. The buckle device 32 is also provided with a release button 54, and when the release button 54 is pushed in by an occupant of the vehicle the tongue plate 42 is released from the buckle device 32.

Accordingly, if the tongue plate 42 is received in the buckle device 32 after it is inserted in the slit hole 50, then the child occupant 26 is put in a restrained situation by a seatbelt system of five point type. That is to say, a portion of the continuous webbing 28 positioned between the slit opening 36 and the tongue plate 42 and a portion of the continuous webbing 30 positioned between the slit opening 36 and the tongue plate 48 function as a pair of shoulder webbings, and a portion of the continuous webbing 28 positioned between the tongue plate 42 and the slit opening 34 and a portion of the continuous webbing 30 between the tongue plate 46 and the slit opening 34 function as a pair of lap webbings, the buckle device 32 functioning as a crotch belt.

The seat plate portion 14 is formed at both side portions with a pair of slits 56 and 58, as shown in FIG. 2. Each of the slits 56 and 58 is extended from a front end face of the seat plate portion 14 towards the back plate portion 16 and it defines a rectangular space when viewed from the above of the seat plate portion 14.

Consequently, when an intermediate portion of an occupant restraining webbing 60 equipped on the vehicle is inserted in the slits 56 and 58, it is not exposed on the seat plate portion 14, namely, it is positioned under the back of the seat plate portion 14, as shown in FIG. 2 with an image line.

One end portion of the webbing 60 is secured to an anchor plate 64 mounted on a side wall 62 of the vehicle and the other end portion thereof is retracted in a webbing retractor 66 mounted on the side wall 62 by means of a biasing force of the webbing retractor 66. It is preferable that the webbing retractor 66 is provided therein with an inertia locking mechanism preventing the webbing 66 from being unwound immediately when the vehicle falls in an emergency situation.

The webbing 60 is received at its intermediate portion in a slit hole 70 formed on a tongue plate 68 which can be locked to a buckle device 72 mounted projectingly on the vehicle body. Also, a portion of the webbing 60 positioned between the tongue plate 68 and the webbing retractor 66 is turned back by a through-ring 74 secured on the side wall 62. Accordingly, when the tongue plate 68 is locked to the buckle device 72 by an adult occupant sitting on the seat of the vehicle including the seat base 22 and the seat back 24, a portion of the webbing 60 positioned between the anchor plate 64 and the buckle device 72 functions as a lap webbing and that positioned between the buckle device 72 and the through-ring 74 functions as a shoulder webbing.

An upper portion of each of the side walls 18 and 20 of the vessel 10 is applied to abut on the webbing 60.

That is to say, a portion of the webbing positioned between the slit 58 and the tongue plate 68 and that positioned between the slit 56 and the anchor plate 64 are bent at the upper portions of the side wall portions 20 and 18, so that the vessel 10 is reliably secured to the seat base 22 and the seat back 24.

In addition, each of the side wall portions 18 and 20 is formed at an outer face thereof with an L-shaped protrusion 76 so that a slit 78 is formed between the outer face and the protrusion 76. The slit 78 is opened toward the rear of the vehicle in a situation shown in FIG. 1. An intermediate portion of the webbing 60 turned back by the upper portions of the side wall portions 18 and 20, i.e., that positioned between the buckle device 72 and the anchor plate 64, is received in the slits 78. The slits 78 are much useful when the vessel 10 is secured to the seat of the vehicle in the opposite direction to the direction shown in FIG. 1. That is to say, when a child occupant having a small body build, for example, a baby, is received in the vessel 10, the child occupant is preferably caused to sit on the vessel 10 towards the rear of the vehicle. Accordingly, the vessel 10 should be disposed on the seat in the opposite direction to the situation shown in FIG. 1. In this case the slits 78 can be prevented from an accidental movement in a direction of the front of the vehicle.

Furthermore, each of the side wall portions 18 and 20 is formed at a boundary portion between the seat plate portion 14 and the back plate portion 16 with a through-hole 80 through which the webbing 60 passes, if necessary.

Each of the side wall portions 18 and 20 is fixed at it outer and lower portion with pin 82 projected outwardly. Supported rotatably to each of pins 82 is a crank lever 84 through a hole 86 formed at one end portion thereof, and both the crank levers 84 are connected integrally to each other by a rod 88. Each of the crank levers 84 is further formed with another hole 90, and the respective holes 90 receive both ends of a supporting bar 92.

The supporting bar 92 is made of a material having a predetermined rigidity, and it is bent upwardly once at its rear portion and is further bent forwardly to be formed with a stopper 94. On the other hand, the vessel 10 is formed at its back and lower portion with upper and lower grooves 96 and 98 fitting the stopper 94 of the supporting bar 92 in a two-step manner, as shown in FIG. 1.

Accordingly, when the stopper 94 is applied to the lower groove 98, the child occupant 26 is put in an ordinary sitting situation, as shown in FIG. 1. Also, when the supporting bar 92 is rotated together with the crank levers 84 in a counterclockwise direction on FIG. 1 and the stopper 94 is applied to the upper groove 96, the child occupant 26 is put in a reclining situation, as shown in FIG. 3.

Figure 3:
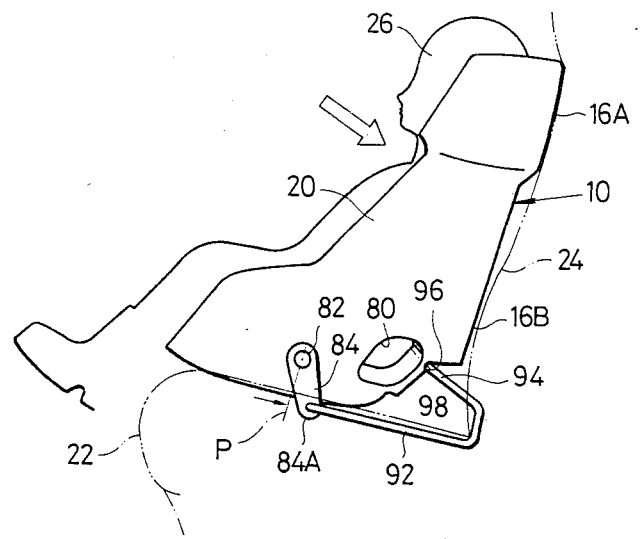
FIG. 3 is a side view showing the child restraining device which is reclined.

In this connection, the back of the vessel 10 is preferably caused to abut on the seat back 24 in two step manner, as shown as reference numerals 16A and 16B in FIG. 3.

In addition, a distal end 84A of each of the crank levers 84 is positioned at a more forward position than a normal line P of a contacting portion between the vessel 10 and the seat base 22 passing through the pins 82 in the normal situation shown in FIG. 1, whereby the crank levers 84 and the supporting bar 92 are prevented from accidental rotations in counterclockwise directions. Also, the crank levers 84 and the supporting bar 92 are prevented from rotations in clockwise directions by the stopper 94.

Moreover, if the distal end 84A of each of the crank levers 84 is positioned at a more backward position than the normal line P in the reclined situation shown in FIG. 3, then the crank levers 84 and the supporting bar 92 can be prevented from rotations in the clockwise direction. In this case, the rear end of the supporting bar 92 is caused to abut on the seat back 24, so that the crank levers 84 are securely prevented from rotations in the counterclockwise direction.

Figure 4:
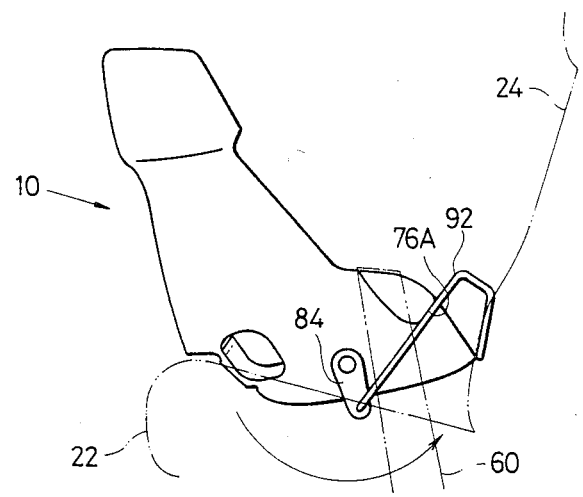
FIG. 4 is a side view in which the child restraining device is applied for a baby.

In this connection the protrusion 76 has a lower face 76A abutting on the supporting bar 92 when the vessel 10 is disposed as shown in FIG. 4.

The child restraining device constructed in the above manner is applied to the vehicle as follows:

The vessel 10 of the child restraining device is placed on the seat base 22, and it is secured to the seat base 22 and the seat back 24 by the webbing 60, as shown in FIG. 1. The securing of the vessel 10 is conducted by locking the tongue plate 68 to the buckle device 72 after the webbing 60 is received in the slits 56 and 58 through the upper portions of the side wall portions 18 and 20 as shown with an image line in FIG. 2.

Accordingly, an intermediate portion of the webbing 60 is disposed under the seat plate portion 14, whereby the child occupant 26 sitting on the seat plate portion 14 is not caused to abut on the webbing 60 so that the child restraining device is improved in confortability.

The continuous webbings 28 and 30 are positioned at the front of the child occupant 26 which has sat on the seat plate portion 14 and the locking protrusion 42A is locked to the buckle device 32 after it is inserted in the slit hole 50 of the tongue plate 46, so that the child occupant 26 is put in a restrained situation. In this situation the webbing 60 does not go across the front of the child occupant 26 and, therefore, the child occupant is not prevented from his freedom in actions.

For the securing of the vessel 10 to the seat of the vehicle by the webbing 60 the intermediate portion of the webbing 60 positioned between the anchor plate 64 and the tongue plate 68 is applied, whereby even if the webbing 60 is of a three point type as shown in FIG. 1, an intermediate portion of the webbing 60 between the tongue plate 68 and the through-ring 74 does not prevent the securing of the vessel 10.

When the vehicle falls in an emergency situation, the vessel 10 is securely supported to the seat base 22 and the seat back 24 by the webbing 60 through the inertia locking mechanism of the webbing retractor 66 in which the child occupant 26 is, of course, restrained by the continuous webbings 28 and 30, whereby the child occupant 26 is kept in a securely restrained situation.

Particularly, as the webbing 60 is turned at the upper portions of the side wall portions 18 and 20, the vessel 10 can reliably be secured to the seat of the vehicle even if the buckle device 72 is disposed beyond the upper face of the seat base 22, as shown in FIG. 1.

The child occupant 26 can get off the vehicle readily by pushing down the release button 54. That is to say, if the continuous webbings 28 and 30 are released from the restraining situation, the child occupant 26 can get off the vehicle apart from a situation of the webbing 60. In this case, it is unnecessary to release the tongue plate 68 from the buckle device 72. Consequently, in a time of the next getting-on the child occupant 26 can readily be put in the restrained situation by locking the locking protrusion 42A to the buckle device 32 after he sits on the seat plate portion 14. Thus, the operations of the child restraining device are very simple.

In such a vehicle that the buckle device 72 is disposed below the upper end portion of the seat base 22 and the webbing 60 includes a shoulder webbing and a lap webbing separatable from each other, the vessel 10 can be secured to the seat of the vehicle by locking the tongue plate 68 to the buckle device 72 through the slits 56 and 58 in the same manner as the above or through the through holes 80.

In the above embodiment the width of each of the slits 56 and 58 may be narrow to such an extent that the webbing 60 can pass through the same. Also, a suitable cover is provided for each of the slits 56 and 58.

Next, the reclining of the vessel 10 is carried out as follows:

The vessel 10 is lifted up slightly, the crank levers 84 and the supporting bar 92 are rotated about the pins 82 in a counterclockwise direction on FIG. 1 and the stopper 94 is moved from the groove 98 to the groove 96. By these operations the vessel 10 is rotated in a direction of an arrow so that the vessel 10 is set in the reclined situation. In the reclined situation a lower face of the seat plate portion 14 abuts on the seat base 22, a back face 16A of the back plate portion 16 abuts on the seat back 24 and the rear end portion of the supporting bar 94 abuts on the seat back 24, so that the vessel 10 is securely supported on the seat of the vehicle. Thereafter, the child occupant 26 sits on the seat plate portion 14 and is put in the restrained situation by the webbing 12 in the same manner as the above.

In the connection, the movement of the supporting bar 92 can be conducted by a one-touch operation, which does not require much labor. Also, the webbing 60 and the seat base 22 have an elasticity to a certain extent and, therefore, the above operation can be conducted without releasing the vessel 10 from the webbing 60. In addition, since the supporting bar 92 is fixed at the respective positions shown in FIGS. 1 and 3, the supporting bar 92 does not requires another locking mechanism for locking the supporting bar 92.

The child restraining device according to this embodiment can be used as a body restraining device by changing its direction. In other words, the supporting bar 92 is rotated in a counterclockwise direction at about 180°, the rear end of the supporting bar 92 is caused to abut on the seat back 24, and the vessel 10 is secured to the seat base 22 by the webbing 60, as shown in FIG. 4.

In this situation a baby (not shown) is received in the vessel 10 in the direction of the rear of the vehicle and the baby is restrained by the child restraining means 12, so that a shock acting upon the baby in the front direction of the vehicle in the emergency situation of the vehicle can be reduced. Also, at that time the vessel 10 is prevented from the movement in the rear direction of the vehicle since the lower face 76A of the protrusion 76 is caused to abut on the supporting bar 92.

Figure 5:
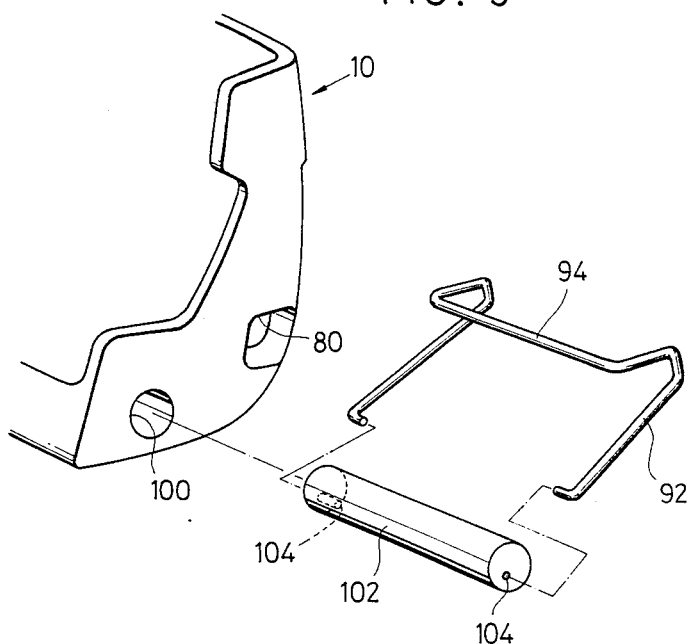
FIG. 5 is a disassembled perspective view showing a second embodiment of the reclining mechanism of the child restraining device according to the present invention.

In FIG. 5, shown is a second embodiment of the reclining mechanism of the child restraining device. In the embodiment the vessel 10 is formed at its lower portion with a long through-hole 100 along the width direction of the vessel 10 and a roller 102 is rotatably received in the long through-hole 100. The roller 102 is formed at its both end faces eccentrically with small recesses 104 in which both the distal end portions of the supporting bar 92 are received.

Accordingly, an eccentric distance of the small recess 104 in this embodiment corresponds to the crank lever 84 in the first embodiment and, therefore, the supporting bar 92 can practice a crank motion in the same manner as the first embodiment. In the second embodiment, also, the wearing of the webbing and the reclining operation of the child-restraining device can be conducted as well as the first embodiment.

Figure 6:
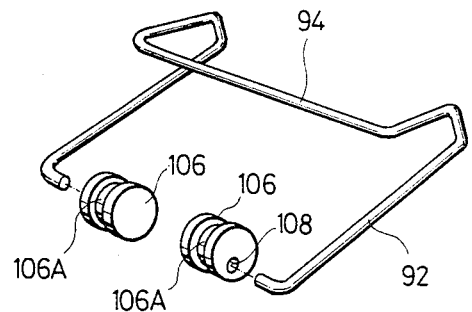
FIG. 6 is a disassembled perspective view showing a third embodiment of the reclining mechanism of the child-restraining device according to the present invention.

In FIG. 6, shown is a third embodiment of the reclining mechanism of the child restraining device. Supported rotatably to the vessel 10 at its both lower side portions are a pair of rollers 106. The rollers 106 are formed at their eccentric positions with small recesses 108 in which both ends of the supporting bar 92 are received. Each of the rollers 106 is formed at it outer peripheral and central portion with an annular groove 106A so that it is prevented from getting off from a supporting hole (not shown) formed at the lower side portion of the vessel 10.

In this case the eccentric distance of the small recess 108 corresponds to the crank lever 84 of the first embodiment as well as the second embodiment and, therefore, the supporting bar 92 can practice a crank motion.

The above embodiments are constructed so that the supporting bar 92 can be rotated in two step manner, but, of course, the child reclining device according to the present invention can also be constructed so that the supporting bar 92 can be rotated in three or more step manner, i.e., in a multi-step manner, by increase in number of the groove formed on the vessel 10.

What is claimed is:

1. A child restraining device for restraining a child occupant of a vehicle, which comprises:
   (a) a child receiving vessel secured on a seat of the vehicle by a webbing of the vehicle;
   (b) child restraining means for restraining the child occupant on the vessel; and
   (c) a reclining mechanism including a supporting member for supporting the vessel on the seat, the supporting member being provided with a pair of distal end portions, each of which is rotatably supported on a crank means, and a rear portion serving to abut the seat in a supporting relationship, the two crank means including a pair of crank levers connected to each other by a rod and rotatably supported by pins provided on either side of the vessel, whereby the vessel can be reclined readily.

2. A child restraining device for restraining a child occupant of a vehicle, which comprises:
   (a) a child receiving vessel secured on a seat of the vehicle by a webbing of the vehicle;
   (b) child restraining means for restraining the child occupant on the vessel; and
   (c) a reclining mechanism including a supporting member for supporting the vessel on the seat, the supporting member being provided with a pair of distal end portions rotatably supported in a stepped manner to both outer sides of the vessel through a crank means, wherein the crank means is a roller rotatably supported by the vessel, to which both the distal end portions of the supporting member are connected eccentrically.

3. A child restraining device as set forth in claim 2, wherein the roller is received in a through-hole formed on a lower portion of the vessel.

4. A child restraining device as set forth in claim 2, wherein the crank means includes a pair of rollers supported rotatably at both the side portions of the vessel, to which the distal end portions of the supporting member are connected eccentrically.

5. A child restraining device as set forth in claim 4, wherein each of the rollers are received in a hole formed on each of the outer side portions of the vessel.

6. A child restraining device as set forth in claim 5, wherein each of the rollers are formed at its outer peripheral and middle portion with an annular groove, whereby each of the rollers is prevented from getting off from the hole.

7. A child restraining device as set forth in claim 1, wherein the vessel includes a back face having a plurality of grooves to which the rear portion of the supporting member is capable of being latched, whereby the angle that the vessel is reclined relative to the seat can be changed in a stepped manner.

8. A child restraining device as set forth in claim 2, wherein the vessel includes a back face having a plurality of grooves to which the rear portion of the supporting member is capable of being latched, whereby the angle that the vessel is reclined relative to the seat can be changed in a stepped manner.

9. A child restraining device as set forth in claim 4, wherein the vessel is formed at its back face with a plurality of grooves to which the rear portion of the supporting member is capable of being latched, whereby an angle of the vessel to the seat can be changed in a step manner.

10. A child restraining device for restraining a child occupant of a vehicle, which comprises:
    (a) a child receiving vessel secured on the seat by a webbing of the vehicle, the vessel including a seat plate portion which the child occupant sits on, a back plate portion on which the back of the child abuts and side wall portions positioned at both sides of the child occupant sitting on the seat plate portion;
    (b) a webbing provided on the vessel for restraining the child occupant on the vessel, and
    (c) a supporting bar for supporting the vessel on the seat, the supporting member being provided with
        (i) a pair of distal end portions rotatably supported in a multi-step manner to both the side wall portions of the vessel through crank means, wherein the crank means includes a pair of crank levers connected to each other through a rod and rotatably supported by pins provided on the outer sides of the side wall portions, and
        (ii) a rear portion serving to abut on the seat when the vessel is secured on the seat of the vehicle, whereby the vessel can be reclined readily.

11. A child restraining device for restraining a child occupant of a vehicle, which comprises:
    (a) a child receiving vessel secured on the seat by a webbing of the vehicle, the vessel including a seat plate which the child occupant sits on, a back plate portion on which the back of the child occupant abuts and side wall portions positioned at both sides of the child occupant sitting on the seat plate portion;
    (b) a webbing provided on the vessel for restraining the child occupant on the vessel, and
    (c) a supporting bar for supporting the vessel on the seat, the supporting member being provided with
        (i) a pair of distal end portions rotatably supported in a multi-step manner to both the side wall portions of the vessel through crank means, wherein the crank means includes a roller rotatably supported by the vessel to which both the distal end portions of the supporting bar are eccentrically connected, and
        (ii) a rear portion serving to abut on the seat when the vessel is secured on the seat of the vehicle, whereby the vessel can be reclined readily.

12. A child restraining device as set forth in claim 11, wherein the roller is received in a through-hole formed on a lower portion of the vessel.

13. A child restraining device as set forth in claim 11, wherein the crank means includes a pair of rollers supported rotatably at both the side wall portions of the vessel, to which both the distal end portions of the supporting bar are connected eccentrically.

14. A child restraining device as set forth in claim 13, wherein each of the rollers are received in a hole formed on each of the side wall portions and is formed at its outer peripheral and middle portion with an annular groove, whereby each of the rollers is prevented from getting off from the hole.

15. A child restraining device as set forth in claim 10, wherein the vessel is formed at its back face with a plurality of grooves to which the rear portion of the supporting bar is capable of being latched, whereby the angle that the vessel is reclined relative to the seat can be changed in a multi-step manner.

16. A child restraining device as set forth in claim 13, wherein the vessel includes a back face having a plurality of grooves to which the rear portion of the supporting bar is capable of being latched, whereby the angle that the vessel is reclined relative to the seat can be changed in a multi-step manner.

17. A child restraining device for restraining a child occupant of a vehicle, which comprises:
  (a) a child receiving vessel secured on a seat of the vehicle by a webbing of the vehicle, wherein said vessel includes a back face, and a pair of side walls, each of which has a front portion and a rear portion;
  (b) child restraining means for restraining the child occupant on the vessel, and
  (c) a reclining mechanism including a supporting member for supporting the vessel on the seat, the supporting member having
    (i) a pair of distal end portions rotatably supported in an off-center manner to the front portions of both side walls of the vessel through crank means, and
    (ii) a rear portion serving to abut the back face of the seat, so that the angle that the vessel is reclined relative to the seat may be changed by rotating the crank means.

* * * * *